(12) United States Patent
Itou et al.

(10) Patent No.: US 8,445,106 B2
(45) Date of Patent: May 21, 2013

(54) RESIN-COATED METAL SHEET AND RESIN COMPOSITION

(75) Inventors: Yoshihiro Itou, Kobe (JP); Naoya Fujiwara, Kobe (JP); Kiyomi Aoki, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 1341 days.

(21) Appl. No.: 11/458,247

(22) Filed: Jul. 18, 2006

(65) Prior Publication Data

US 2007/0031676 A1 Feb. 8, 2007

(30) Foreign Application Priority Data

Aug. 2, 2005 (JP) ................................. 2005-224557

(51) Int. Cl.
*B32B 27/36* (2006.01)
*B32B 27/06* (2006.01)

(52) U.S. Cl.
USPC ........ 428/411.1; 428/418; 428/422; 428/457; 428/461; 523/465; 524/487

(58) Field of Classification Search
USPC ....... 428/411.1, 418, 422, 457, 461; 523/465; 524/487
See application file for complete search history.

(56) References Cited

U.S. PATENT DOCUMENTS

| | | | | |
|---|---|---|---|---|
| 3,953,479 A | * | 4/1976 | Force et al. | 549/557 |
| 5,802,440 A | * | 9/1998 | Maeyama | 430/45.5 |
| 6,107,260 A | | 8/2000 | Sugita et al. | |
| 6,329,329 B1 | | 12/2001 | Sharp et al. | |
| 2002/0037400 A1 | * | 3/2002 | Fujiwara et al. | 428/330 |
| 2002/0098367 A1 | * | 7/2002 | Mori et al. | 428/457 |

FOREIGN PATENT DOCUMENTS

| | | |
|---|---|---|
| EP | 0 736 592 A1 | 10/1996 |
| GB | 1 205 792 | 9/1970 |
| JP | 50-89427 | 7/1975 |
| JP | 8-323286 | 12/1996 |
| JP | 2000-38539 | 2/2000 |
| JP | 2000-327989 | 11/2000 |
| JP | 2001-172776 | 6/2001 |
| JP | 2002-47580 | 2/2002 |
| JP | 2002-371332 | 12/2002 |

OTHER PUBLICATIONS

Office Action issued Nov. 24, 2010, in Japan Patent Application No. 2006-210279 (with English translation).

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

An object of the present invention is to provide a resin-coated metal sheet which not only is excellent in stamping performance (lubricity of a resin layer) and film removability by alkaline cleaning but also has improved blocking resistance. Further, another object of the present invention is to provide a resin composition used for forming a resin layer having such properties on a metal sheet. A resin-coated metal sheet according to the present invention is characterized in that a resin layer containing polyethylene glycol whose number average molecular weight is 18,000 to 500,000 and paraffin wax whose average molecular weight is 400 or less is laminated on one side or both the sides of the metal sheet.

20 Claims, No Drawings

RESIN-COATED METAL SHEET AND RESIN COMPOSITION

FIELD OF THE INVENTION

The present invention relates to a resin-coated metal sheet used for press forming and a resin composition used for forming a resin layer on the metal sheet.

BACKGROUND OF THE INVENTION

Press forming of a metal sheet is used in a very broad range of fields from the manufacturing of industrial products such as automobiles, household appliances, and office equipment to the manufacturing of daily necessaries such as beverage cans, sink cabinets, and bathtubs, and occupies an important place in the field of plastic working. In recent years accordingly, in order to reduce the weight of an automobile for example, it has been expected to apply press forming to a material such as a high-tensile steel sheet, an aluminum alloy sheet, or the like. However, such a metal sheet has poorer formability than a cold-rolled steel sheet. Consequently, a technology for improving formability of a high-tensile steel sheet or the like and facilitating the press forming thereof has been demanded.

In the case of press forming, with the aim of preventing the damages caused by poor lubricity on the surfaces of a die and a metal sheet, processing of improving lubricity and workability by coating a metal sheet with pressforming lubricant oil has heretofore been applied. However, a problem in the use of pressforming lubricant oil is that the work environment deteriorates because of the scatter of the pressforming lubricant oil. In addition, in recent years, the influence of a chlorine-based organic solvent or the like used for the cleaning of pressforming lubricant oil on environment has also been pointed out.

In view of the above situation, as a technology which allows excellent formability to be expected, and moreover, the deterioration of work environment and the increase of environmental load caused by the scatter of pressforming lubricant oil and the evaporation of a cleaner to be suppressed, known is a method of forming a resin layer excellent in lubricity beforehand on the surface of a metal sheet. The technology is a means whereby a material manufacturer as the supplier of a metal sheet forms a resin layer beforehand (pre-coat) on the surface of the metal sheet and thereby, when a customer processes the metal sheet, the customer can press-form the metal sheet without the use of pressforming lubricant oil or the like. Such resin-coated metal sheets are roughly classified into the following two types.

One type is a non-stripping type resin-coated metal sheet which is designed so as to be able to use a resin coating layer as the final coated film as it is in order to simplify the process of press forming. However, problems of the metal sheet are that the metal sheet has poor electrical conductivity since the resin coating layer remains on the surface of the metal sheet even after the press forming, and that makes it difficult to apply chemical conversion treatment, electrodeposition coating, welding, and others. In addition, it is extremely difficult technically to impose properties, such as chemical resistance, corrosion resistance, and scratch resistance, required for the final coated film and at the same time stamping performance on the resin layer.

The other type is a resin-coated metal sheet which is designed, on the premise that the final coated film is formed in another process, so as to form a stripping type resin layer excellent in lubricity beforehand and then remove the resin layer by alkaline cleaning or the like after press forming before the forming of the final coated film. With the metal sheet, the resin layer can be removed by using an alkaline degreasing process conventionally incorporated into a coating line for metal sheets and hence extra cost can be avoided and the metal sheet can conveniently be used.

As such a stripping type resin-coated metal sheet, JP-A No. 38539/2000 discloses: a composition (paint) of an alkali stripping type, wherein the composition is a water-soluble copolymer having methacrylate ester or the like as the monomer, and the glass-transition temperature and others of the methacrylate ester are stipulated; and a steel sheet on which a coated film is formed with the paint. It is said that the object of the technology is to improve the rust resistance and stamping performance of a steel sheet.

Further, JP-A No. 502089/1996 describes a technology related to a metal which has been subjected to lubrication treatment with a lubricant containing partial ester of dihydroxy compounds or the like such as ethylene glycol monolaurate as an essential ingredient. It is said that the film has lubricity suitable for press forming operation and can easily be removed with a water-based alkali cleaner.

Furthermore, JP-A No. 172776/2001 discloses an alkali-soluble type lubricant-coated stainless steel sheet on which a film containing polyolefin wax or the like is formed as a lubricity-imparting agent, and JP-A No. 371332/2002 describes an aluminum alloy sheet having a similar film. Those films have alkali film removability and certain formability.

Further, JP-A No. 323286/1996 discloses an aluminum alloy sheet having a film of polyethylene oxide whose average molecular weight is 50,000 to 5,000,000, namely polyethylene glycol of relatively high molecular weights, on the surface thereof. In addition, International Publication WO 95/18202 describes: a lubricant containing polyalkylene oxide, such as polyethylene oxide, and higher fatty acid salt; and an aluminum or aluminum alloy sheet coated with the lubricant.

As stated above, resin-coated metal sheets aimed at having both the lubricity and film removability of resin layers have heretofore been known. However, the resin layer used for such a conventional resin-coated metal sheet has not had such sufficient lubricity as to be applicable to an aluminum alloy sheet or the like which is hardly press-formed and resultantly the formability of the metal sheet has not been sufficient in some cases.

For example, the resin layer disclosed in JP-A No. 38539/2000 has poor lubricity and hence the stamping performance of a steel sheet coated with the resin layer is insufficient. Further, in the cases of the resin layers disclosed in JP-A Nos. 172776/2001 and 371332/2002 too, it is estimated that formability is still insufficient when they are applied to a material which is hardly processed.

In the meantime, JP-A No. 323286/1996 and International Publication WO 95/18202 describe an aluminum sheet and the like having a resin layer containing polyethylene oxide and the formability of the resin layer is experimentally verified. However, in consideration of the properties required for an aluminum sheet and the like in recent years, it is necessary to further improve the formability.

Further, when conventional resin-coated metal sheets are piled into a stack and stored, the resin layers have sometimes stuck to each other (hereinafter, this phenomenon is called "blocking") particularly in the case where a large number of sheets are piled, in a tropical region, or in summer season. Once such blocking occurs, not only it becomes difficult to take out the metal sheets one by one at the time of use and operability deteriorates but also the coating weight of the resin is uneven due to the exfoliation or the like of the resin layer and stable formability cannot be obtained.

For example, the resin layer disclosed in JP-A No. 502089/1996 is mainly composed of low molecular weight compounds having a low melting point, and hence is likely to stick to another resin layer, and is also inferior in blocking resistance. Moreover, another problem is that, when the resin layer is exposed to a high pressure at the time of forming, the resin layer is likely to be pushed out of the working plane and thus is inferior in formability. In addition, film-forming capability when the resin layer is formed on a metal sheet is also insufficient.

SUMMARY OF THE INVENTION

In view of the above situation, an object of the present invention is to provide a resin-coated metal sheet which not only is excellent in stamping performance (lubricity of a resin layer) and film removability by alkaline cleaning but also has improved blocking resistance. Further, another object of the present invention is to provide a resin composition used for forming a resin layer having such properties on a metal sheet.

The present inventors have earnestly studied a resin layer with which a metal sheet is coated in order to address the above problems. As a result, they have found that the above problems can be addressed by using a resin layer containing polyethylene glycol and paraffin wax having specific molecular weights as essential ingredients and have established the present invention.

That is, a resin-coated metal sheet according to the present invention is a metal sheet coated with resin and characterized in that: a resin layer is laminated on one side or both the sides of the metal sheet; and the resin layer contains a component A comprising polyethylene glycol whose number average molecular weight is 18,000 to 500,000 and a component B comprising paraffin wax whose average molecular weight is 400 or less.

As such a resin layer as described above, a resin layer further containing a component C comprising a mixture of one or more kinds selected from the group of polyethylene wax, amide wax, and polytetrafluoroethylene is preferably used. This is because such a mixture can improve the lubricity of the resin layer and further improve the formability of a metal sheet.

It is also preferable that a resin layer further contains a component D comprising water-soluble epoxy compounds. In many cases, a resin-coated metal sheet is subjected to bonding treatment such as welding, adhering, or the like after forming before a film stripping process. Hence, a resin layer still remaining after forming is required not to considerably deteriorate such bondability. The component D is important as a substance which does not largely deteriorate bonding strength even when adhering treatment is applied while a resin layer remains.

As such a resin layer as described above, it is preferable that the weight ratio of the component A to the component B is in the range between 99 to 1 and 60 to 40. Further, it is also preferable that a resin layer contains all the components A to D and the weight ratio of the components A and D to the components B and C is in the range between 99 to 1 and 60 to 40. This is because a resin layer having the components in the above ranges is particularly excellent in lubricity, film removability, and blocking resistance.

A preferable coating weight of a resin layer per one side of a metal sheet is in the range of 0.1 $g/m^2$ to 2.5 $g/m^2$. This is because by so doing it is possible to effectively exhibit the lubricity of the resin layer and also suppress the exfoliation of the resin layer at the time of pressing.

Further, a resin composition according to the present invention is a resin composition used for forming a resin layer on a metal sheet and characterized by containing: a component A comprising polyethylene glycol whose number average molecular weight is 18,000 to 500,000; a component B comprising paraffin wax whose average molecular weight is 400 or less; and a solvent.

It is preferable that such a resin composition further contains at least one of the components C and D for the same reasons as stated in the resin layer of a resin-coated metal sheet.

A resin-coated metal sheet according to the present invention has a resin layer excellent in lubricity and hence makes it possible not only to exhibit good workability at press forming but also to remove the laminated resin layer by water washing or alkaline cleaning after the press forming. Moreover, in spite of the fact that a resin layer exists, the bonding strength hardly deteriorates largely even in bonding treatment such as welding, adhering, or the like which is applied after press forming before film removing treatment. Further, since the resin-coated metal sheet is excellent in blocking resistance, the sticking between the metal sheets which has heretofore tended to occur while they are piled up and stored is suppressed.

As a result, a resin-coated metal sheet according to the present invention: has good formability even when it is particularly made of a metal which is hardly press-formed; and hence can preferably be used as a material for automobile parts and others. Further, a resin composition according to the present invention is useful as a resin composition which makes it possible to form a resin layer having such properties on a metal sheet.

DETAILED DESCRIPTION OF THE PREFERRED EMBODIMENTS

A resin-coated metal sheet according to the present invention is a metal sheet coated with resin and characterized in that: a resin layer is laminated on one side or both the sides of the metal sheet; and the resin layer contains a component A comprising polyethylene glycol whose number average molecular weight is 18,000 to 500,000 and a component B comprising paraffin wax whose average molecular weight is 400 or less.

The type of a metal sheet coated with a resin layer is not particularly limited in the present invention and, for example, a hot-dip galvanized steel sheet, an alloyed hot-dip galvanized steel sheet, a hot-rolled steel sheet, a cold-rolled steel sheet, an electrogalvanized steel sheet, an electrical Zn—Ni plated steel sheet, a stainless steel sheet, an aluminum sheet, various types of aluminum alloy sheets, and a titanium sheet can be used. By the present invention, it is possible to exhibit good formability even with a metal sheet such as an aluminum alloy sheet which has heretofore been regarded particularly as being hardly press-formed.

Further, with regard to the shape of a metal sheet in the present invention too, it is not particularly limited as long as the shape is tabular and, for example, a metal strip which is a strip-shaped metal sheet is also included.

In order to obtain better corrosion resistance and resin adhesiveness, a metal sheet used in the present invention, before coated with a resin layer, may be subjected to phosphate treatment, chromate treatment, pickling treatment, alkaline cleaning, electroreduction treatment, cobalt plating treatment, nickel plating treatment, silane coupling agent treatment, inorganic silicate treatment, or other treatment.

Polyethylene glycol (component A) which is an essential constituent component of a resin layer according to the present invention has the functions and effects of: improving the formability of a metal sheet; and also facilitating the removal of the resin layer after press forming by water washing or alkaline cleaning because it is water-soluble resin. Meanwhile, a resin layer having film removability can be obtained also with water-soluble resin, such as acrylic resin, polyvinyl alcohol, cellulosic resin, polyacrylamide, polyvinyl pyrrolidone, or the like, which has been added to the resin layer of a conventional resin-coated metal sheet. However, the lubricity of a conventional resin layer containing such resin as a major component has not been satisfactory and the formability of a metal sheet covered with such a resin layer has been insufficient.

The number average molecular weight of the component A according to the present invention is set at 18,000 to 500,000. When the number average molecular weight is less than 18,000, the resin layer is inferior in film-forming capability and adhesiveness to a metal and hence it is impossible to form a stable resin layer on a metal sheet and moreover the stamping performance may be adversely affected. Therefore, such a number average molecular weight is not preferable. On the other hand, when the number average molecular weight exceeds 500,000, the viscosity of the resin composition applied when a resin layer is formed increases and operability deteriorates and moreover stamping performance also tends to lower. Therefore, such a number average molecular weight is not preferable. In view of such trends, the number average molecular weight of the component A is preferably 20,000 or more, and yet preferably 30,000 or more. Further, the number average molecular weight is preferably 200,000 or less, yet preferably 100,000 or less, and still yet preferably 50,000 or less.

If the number average molecular weight of the component A is described in a catalog or the like of the used component A, the value in the catalog may be referred to. However, when a measurement method of a number average molecular weight described in a catalog or the like is not obvious or the number average molecular weight is not described in the catalog, a number average molecular weight of the component A can be obtained by an ordinary method. For example, it may be obtained by obtaining the molecular weight distribution of the used component A (polyethylene glycol) by gel permeation chromatography (GPC) and then obtaining the number average molecular weight from the molecular weight distribution.

The molecular weight distribution may be measured in the following manner. Fifty milligrams of the component A is dissolved in 50 ml of ultra-pure water and 50 μl of which is subjected to GPC. Two OHpak SB-806M HQ columns (Shodex), a mobile phase of ultra-pure water having a flow rate of 0.6 ml/min, and a refractive index detector are used. The number average molecular weight is calculated based on the result obtained with polyethylene oxide standards.

The addition amount of the component A is not particularly limited but the component A is added so as to be a main component of a resin layer. For that reason, the component A is added so as to occupy a resin layer by 50% or more by mass. In order to more effectively exhibit the properties of the component A, it is preferable to add the component A by 60% or more by mass, and yet preferably 70% or more by mass. On the other hand, with regard to the upper limit thereof, it is preferable to set the component A at about 99% or less by mass in consideration of the balance with other components, yet preferably 95% or less by mass, and still yet preferably 90% or less by mass.

Paraffin wax (component B) which is an essential constituent component in the present invention is a substance which can effectively improve the lubricity of a resin layer in combination with the component A and remarkably improve the stamping performance of a metal sheet. Here, in the case of a conventional resin layer including a resin layer containing acrylic resin as the main component too, the lubricity thereof can be improved by adding a lubricant such as paraffin wax, polyolefin wax, fluorine wax, stearic acid type wax, or the like. However, with such conventional combinations, the stamping performance of a metal sheet made of a hardly-workable material such as an aluminum alloy has not sufficiently been improved. In contrast, in the present invention, by combining the polyethylene glycol (component A) and the paraffin wax (component B) having specific molecular weights, the lubricity of a resin layer has successfully been improved remarkably and a metal sheet extremely excellent in stamping performance has been obtained.

The average molecular weight of the component B is set at 400 or less in the present invention. This is because, when the average molecular weight is 400 or less, it is possible to remarkably improve the lubricity of a resin layer in combination with the component A. Although the reason why the paraffin wax of an average molecular weight in the range can exhibit good lubricity is not necessarily obvious, it is estimated that the paraffin wax in a resin layer melts by frictional heat generated during press forming, bleeds out on the surface of the resin layer, and improves the lubricity. From this viewpoint, the average molecular weight is preferably 390 or less, and yet preferably 380 or less. Here, industrially available paraffin wax is generally a mixture having a molecular weight distribution of a certain range and thus, even when an average molecular weight is 400 or less, sometimes paraffin of a molecular weight exceeding 400 is included therein. Such a case is also included in the scope of the present invention.

If the average molecular weight of the component B is also described in a catalog or the like of the used component B, the value in the catalog may be referred to. However, when a measurement method of an average molecular weight described in a catalog or the like is not obvious or the average molecular weight is not described in the catalog, an average molecular weight of the component B can be obtained by an ordinary method such as Gas Chromatograph (GC) in the following manner.

Fifty milligram of the component B is dissolved in 50 ml of isooctane and 1 μl of which is subjected to GC. A GC-2010 having a FID detector (Shimadzu), UA-DX30 column (Frontier Laboratories Ltd), and a mobile phase of helium are used. A vaporizing cell is heated from 70° C. to 445° C. at the rate of 250° C./min. The column is heated from 60° C. to 160° C. at the rate of 40° C./min, from 160° C. to 35° C. at rate of 15° C./min, and from 350° C. to 445° C. at rate of 7° C./min, then maintains at 445° C. for 4 minutes. The detector maintains at 445° C.

There is correlation between the molecular weight and the melting point of paraffin wax and the melting point of paraffin wax whose molecular weight is 389 is about 58° C. Therefore, it is preferable to use paraffin wax whose melting point is about 60° C. or lower as the component B added in the present invention. Meanwhile, the melting point of paraffin wax whose molecular weight is 338 is about 47° C. and paraffin wax whose melting point is lower than that may sometimes liquefy under some storing conditions and thus it is not desirable from the viewpoint of blocking resistance. Therefore, the average molecular weight of the component B is preferably 300 or more.

The addition amount of the component B is not particularly limited but can be set at 1% or more to 50% or less by mass in accordance with the addition amounts of the component A and other added components. In order to further effectively exhibit the function and effect of the component B, it is preferable to set the addition amount thereof at 5% or more by mass. On the other hand, if the component B is added excessively, there is fear that the component B is hardly removed by water washing or alkaline cleaning and hence it is preferable to set the addition amount thereof at 40% or less by mass.

To a resin layer according to the present invention, besides the aforementioned essential constituent components, it is preferable to further add a mixture (component C) of one or more kinds selected from the group of polyethylene wax, amide wax, and polytetrafluoroethylene. Among the group, polyethylene wax and polytetrafluoroethylene have a high melting point compared with general waxes. Amide wax, for example N,N'-ethylenedi (stearic amide) and N,N'-ethylenedi (oleic amide), has a high melting point and polarity. This is because, by adding the component C, it is possible to further improve the lubricity of the resin layer and improve the stamping performance of a metal sheet.

The form of the used component C is not particularly limited but a powdered state is desirable since the powdery component C is easily mixed into paint used for forming a resin layer. The preferable particle diameter of such powder varies in accordance with the coating weight of the resin layer on a metal sheet. If the particle diameter is excessively large in comparison with the thickness of a rein layer, the problem is that the powder is hardly fixed and the withdrawal of the powder is likely to be caused. Therefore, it is preferable to use the powdery component C having particle diameters of about 10 μm or less.

The addition amount of the component C is not particularly limited but, in order to exhibit the function and effect thereof and simultaneously not to hinder the functions of the components A and B, it is desirable to control the addition amount of the component C approximately in the range of 5% or more to 20% or less by mass.

It is preferable to further add water-soluble epoxy compounds (component D) to a resin layer according to the present invention. A resin-coated metal sheet is subjected to bonding treatment such as welding or adhering after forming before a film stripping process in many cases. However, it is natural that adhering strength lowers when a metal sheet is coated with a resin layer. The component D is important as a substance which does not largely deteriorate the adhering strength even when a metal sheet on which a resin layer still remains is subjected to adhering treatment.

The component D is a compound which contains an epoxy group, a group including an epoxy ring such as a glycidyl group, and a water-soluble part in the structure. The examples are polyethylene glycol diglycidyl ether, polypropylene glycol diglycidyl ether, glycerol polyglycidyl ether, sorbitol polyglycidyl ether, polyglycerol polyglycidyl ether, and diglycerol polyglycidyl ether.

The addition amount of the component D is not particularly limited but, in order not to hinder the functions of other components, it is desirable that the addition amount is about 20% or less by mass.

In addition to the above additive components, components known by those skilled in the art may be added in a resin layer according to the present invention. The examples are lubricants such as carnauba wax and microcrystalline wax, an electrically conductive additive to impart electrical conductivity, a surface-active agent, a thickening agent, an antifoaming agent, a dispersing agent, a desiccating agent, a stabilizing agent, an antiskinning agent, a fungus resistant agent, an antiseptic agent, and an antifreezing agent, and those examples can properly be used in combination in the range not deteriorating the properties of a resin-coated metal sheet according to the present invention. In particular, in order to improve the dispersibility of paraffin wax in the preparation of paint, it has been effective to add a nonionic surface-active agent.

In a resin layer on a metal sheet according to the present invention, it is preferable that the weight ratio of the component A to the component B is in the range between 99 to 1 and 60 to 40. This is the result obtained from comprehensive consideration of film removability and blocking resistance in addition to the stamping performance of a resin-coated metal sheet. Further, when the aforementioned components A to C are contained, since the component C further enhances the function of the component B, it is also preferable to add the components A to C so that the weight ratio of the component A to the components B and C may be in the range between 99 to 1 and 60 to 40. Furthermore, when all of the aforementioned components A to D are contained, in consideration of the balance between the effects given by the component D and the component configuration of the entire resin layer, it is also preferable to add the components so that the weight ratio of the component A and D to the components B and C may be in the range between 99 to 1 and 60 to 40. The weight ratio thereof is yet preferably in the range between 95 to 5 and 65 to 35, and still yet preferably in the range between 90 to 10 and 70 to 30.

It is preferable that the coating weight of a resin layer formed on a metal sheet per one side of the metal sheet is in the range of 0.1 $g/m^2$ to 2.5 $g/m^2$. This is because, if a coating weight is less than 0.1 $g/m^2$, the metal sheet tends to directly touch a die at press forming and hence sufficient formability may not be obtained undesirably. On the other hand, if a coating weight exceeds 2.5 $g/m^2$, not only the effect of improving lubricity is saturated but also the possibility of the exfoliation of a coating film increases at press forming, debris of a resin layer accumulates on a die and that causes forming failure, and the adhesiveness and weldability of a metal sheet deteriorate. From the above viewpoint, the coating weight of a resin layer per one side of a metal sheet is preferably in the range of 0.3 $g/m^2$ to 2.0 $g/m^2$, and yet preferably in the range of 0.5 $g/m^2$ to 1.5 $g/m^2$.

The coating weight of a resin layer can be obtained by: measuring the weight of a metal sheet before forming a resin layer beforehand; and then dividing the difference between the total weight of the metal sheet after the resin layer is formed and the weight of the metal sheet by the area of the metal sheet on which the resin layer is formed (gravimetric method). Otherwise, when the size of a metal sheet is large or a resin layer is formed continuously in a plant line or the like, it is also possible to obtain a coating weight by comparing a calibration curve obtained by the gravimetric method with a carbon amount quantitatively obtained by fluorescent X-ray analysis or the strength of the absorption peak of C—H stretching frequency or the like obtained by infrared absorption spectrometry.

The production method of a resin-coated metal sheet according to the present invention is not particularly limited. For example, a method of coating a metal sheet with a resin composition according to the present invention and thereafter drying it may be adopted.

A resin composition according to the present invention contains a solvent in addition to the components A and B explained above. Further, it contains the components C and D described above and other components including a dispersing agent in accordance with the component configuration of a resin layer to be formed. Here, a resin layer formed with a resin composition according to the present invention is to be removed later by alkaline cleaning or the like. In the field of the art, such a resin composition is sometimes referred to as "paint" customarily and in particular a resin composition in which water is used as the main solvent is sometimes referred to as "water-based paint."

The main solvent used in a resin composition according to the present invention is water but, with the aim of improving the stability of the paint and the formability of a resin layer, a water-based organic solvent compatible with water may be used in combination. Examples of such a water-based organic solvent are: alcohol such as methanol, ethanol, isopropanol, and butanol; ether alcohol such as methyl cellosolve and ethyl cellosolve; ketone such as acetone, methyl ethyl ketone, and methyl isobutyl ketone; glycol such as ethylene glycol and propylene glycol; glycol ether of such glycols; glycol ester of such glycols; and others. However, the water-based organic solvent is not limited to the examples.

A resin composition according to the present invention may be prepared by adding and mixing the components A to D and others into a solvent and dissolving or suspending them. When water or a mixture of water and a water-based organic solvent is used as the solvent in this case, hydrophilic compounds such as polyethylene glycol and water-soluble epoxy compounds dissolve and lipophilic compounds such as paraffin wax and other lubricants disperse.

The concentration and the viscosity of a resin composition according to the present invention are not particularly limited either and may properly be determined in accordance with the target thickness of a resin layer, the method and apparatus used for forming the resin layer, and others. An example of concepts useful in selecting the concentration and the viscosity of a resin composition is shown hereunder. However, the present invention is not limited to the following example at all.

As stated above, a preferable thickness of the resin layer formed on a resin-coated metal sheet according to the present invention is in the range of 0.1 $g/m^2$ to 2.5 $g/m^2$. By a roll coater method which is a general coating method however, when the thickness of a resin layer is 5 $g/m^2$ or less, the coating weight of the resin composition is unstable or the unevenness thereof is caused, and the film thickness is hardly controlled. Consequently, it is preferable to regulate the viscosity of a resin composition to about 3,000 cPs or lower in order to apply the resin composition stably with a preferred film thickness.

Further, the viscosity of a resin composition mainly depends on the concentration of the component A which has a high molecular weight and is the main component and hence the viscosity of a resin composition is appropriately controlled. In this light, although it also depends on the molecular weight of the used component A and others, it is preferable to set the concentration of the component A at 3 to 15% by mass for example. Further, the concentrations of the components B to D and other components may be determined in accordance with the proportions of the components in a resin layer to be formed. As stated earlier for example, the weight ratios of the component A to the component B, the component A to the components B and C, and the component A and D to the components B and C are preferably in the range between 99 to 1 and 60 to 40, yet preferably in the range between 95 to 5 and 65 to 35, and still yet preferably in the range between 90 to 10 and 70 to 30. Therefore, it is also preferable to adjust the weight ratios of the components A to D of a resin composition in the above ranges.

A resin composition according to the present invention may be applied on a metal sheet by a publicly known method. For example, a resin composition according to the present invention may be applied on one surface or both the surfaces of a metal sheet by a roll coater method, a splay method, dip coating, brush coating, a curtain flow coating method, or the like. Successively, a resin layer is formed by drying it. The drying conditions are not particularly limited. For example, the drying temperature depends on a used solvent and others but in general may be set at 80° C. or higher, and preferably 100° C. or higher. The time for drying may properly be adjusted.

The present invention is concretely explained in reference to examples hereunder. However, the present invention is naturally not limited to the following examples and it is possible to properly modify those in the range conforming to the aforementioned and aftermentioned tenors and all those modifications are included in the technological scope of the present invention.

EXAMPLES

Example 1

Resin-coated metal sheets were produced by: preparing resin compositions so as to be able to form resin layers shown in Table 1; and coating 5J32 aluminum alloy sheets (thickness: 1 mm) with the resin compositions.

For example, the resin composition of Composition No. 1 was prepared by dissolving or dispersing polyethylene glycol having the number average molecular weight of 40,000 (Polyethylene Glycol 40000 made by Wako Pure Chemical Industries, Ltd., 9.9 g) and paraffin wax having the average molecular weight of 373 (130 made by Nippon Seiro Co., Ltd., 0.1 g) in distilled water (90.0 g) of about 70° C. Successively, the resin composition was applied on one surface or both the surfaces of an aforementioned aluminum alloy sheet with a bar coater and thereafter dried for three minutes at 110° C. with a hot air dryer, and resultantly the resin-coated metal sheet of Metal sheet No. 1 was produced. The coating weight of the resin layer is shown in Table 2.

The resin composition of Composition No. 33 was prepared by: dissolving or dispersing polyethylene glycol having the number average molecular weight of 40,000 (Polyethylene Glycol 40000 made by Wako Pure Chemical Industries, Ltd., 9.25 g) and paraffin wax having the average molecular weight of 373 (130 made by Nippon Seiro Co., Ltd., 0.75 g) in distilled water (87.0 g) of about 70° C.; and, after cooling the mixture to the room temperature, adding butanol (3.0 g) as a water-based organic solvent. Successively, the resin composition was applied on one surface or both the surfaces of an aforementioned aluminum alloy sheet with a bar coater and thereafter dried for three minutes at 110° C. with a hot air dryer, and resultantly the resin-coated metal sheet of Metal sheet No. 60 was produced. The coating weight of the resin layer is shown in Table 2.

The formability (formability and a friction coefficient), film removability, and blocking resistance of each of the resin-coated metal sheets Nos. 1 to 41 produced by the same method as explained above were measured as shown below.
[Evaluation of Formability]

The outer periphery of a test piece (180 mm in length, 110 mm in width, and 1 mm in thickness) of a metal sheet both the surfaces of which were coated with resin was constrained with lock beads at a blank holder pressure (P) of 200 kN. The test piece was subjected to stretch forming until the test piece broke at a press speed of 4 mm/sec. with a semispherical punch 50.8 mmφ in diameter (Dp) using a 80-ton hydraulic press (Type 1M080L made by Amino Corporation) and the forming height when the break occurred was measured. The measurement was repeated three times for each metal sheet. The average value is shown as $LDH_0$ (mm) in Table 2.

Evaluation of Formability (Friction Coefficient)

A test piece (20 mm in width, 300 mm in length, and 1 mm in thickness) of a metal sheet both the surfaces of which were coated with resin was interposed between tabular extracting tools (made by SKH Co., Ltd., contact area: 250 mm$^2$, 50 mm in length and 5 mm in width). The withdrawal resistance (F) when the strip sheet was extracted at a speed of 300 mm/sec. while a pressing force (P) of 100 MPa was imposed on the strip sheet was measured by using a tensile tester (TYPE EHF-U2H-20L made by Shimadzu Corporation) and then a friction coefficient (A) was calculated on the basis of the computational expression; friction coefficient $\mu=F/(2\times P)$. The result is shown in Table 2.

Evaluation of Blocking Resistance

Two test pieces (100 mm×100 mm, 1 mm in thickness each) taken from a metal sheet one surface of which was coated with resin were: overlapped with each other so that a resin coated face and a metal face might touch each other; and retained at 50° C. for two hours while a load of 10 MPa was applied. Successively, the test pieces were released from the pressure and cooled to the room temperature. Thereafter, the existence of sticking between the sheets and the state of the transfer of resin from a resin layer to a metal face were visually observed and evaluated by three ranks; a case of no transfer of a resin layer as "good" shown by "O", a case where transfer was observed but no sticking between sheets existed as "fair" shown by "Δ", and a case where sticking between sheets existed and the sheets were not peeled off by their own gravities as "poor" shown by "X". The results are shown in Table 2.

Evaluation of Film Removability

A test piece (100 mm×100 mm, 1 mm in thickness) of a metal sheet one surface of which was coated with resin: was dipped into alkaline cleaning solution (aqueous solution comprising the mixture of 2.0% Surf Cleaner EC90-R and 1.0% Surf Cleaner EC90-L, made by Nippon Paint Co., Ltd.) of pH 11 to 12 for two minutes, the solution being kept at 40° C.; and successively was washed with water for one minute. Thereafter, the wettability by water was evaluated visually by three ranks; a wettability percentage of more than 80% as "good" shown by "O", a wettability percentage of 50% to 80% as "fair" shown by "Δ" and a wettability percentage of less than 50% as "poor" shown by "X". The results are shown in Table 2.

TABLE 1

| Composition No | Construction | Construction Proportion | PEG molecular weight | PW molecular weight |
|---|---|---|---|---|
| 1 | PEG/PW | 99/1 | 40,000 | 373 |
| 2 | PEG/PW | 95/5 | 40,000 | 373 |
| 3 | PEG/PW | 90/10 | 40,000 | 373 |
| 4 | PEG/PW | 80/20 | 40,000 | 373 |
| 5 | PEG/PW | 70/30 | 40,000 | 373 |
| 6 | PEG/PW | 65/35 | 40,000 | 373 |
| 7 | PEG/PW | 60/40 | 40,000 | 373 |
| 8 | PEG/PW | 80/20 | 40,000 | 361 |
| 9 | PEG/PW | 80/20 | 40,000 | 389 |
| 10 | PEG/PW | 80/20 | 20,000 | 373 |
| 11 | PEG/PW | 80/20 | 500,000 | 373 |
| 12 | PEG/PW/PEWAX | 80/10/10 | 40,000 | 373 |
| 13 | PEG/PW/AWAX | 80/10/10 | 40,000 | 373 |
| 14 | PEG/PW/PEWAX/AWAX | 80/10/10 | 40,000 | 373 |
| 15 | PEG/PW/PTFE | 80/10/10 | 40,000 | 373 |
| 16 | PEG/PW/PTFE | 60/20/20 | 40,000 | 373 |
| 17 | PEG/PW/PTFE | 95/2.5/2.5 | 40,000 | 373 |
| 18 | PEG/PW/Water-soluble epoxy | 80/10/10 | 40,000 | 373 |
| 19 | PEG/PW/Water-soluble epoxy | 60/20/20 | 40,000 | 373 |
| 20 | PEG/PW/PEWAX/AWAX/Water-soluble epoxy | 60/10/10/10/10 | 40,000 | 373 |
| 21 | PEG/PW | 99.5/0.5 | 40,000 | 373 |
| 22 | PEG/PW | 55/45 | 40,000 | 373 |
| 23 | PEG/PW/PTFE | 50/25/25 | 40,000 | 373 |
| 24 | PEG/PW | 80/20 | 40,000 | 427 |
| 25 | PEG/PW | 80/20 | 15,000 | 373 |
| 26 | PEG/PW | 80/20 | 750,000 | 373 |
| 27 | PEG | Single | 15,000 | — |
| 28 | PEG | Single | 40,000 | — |
| 29 | PEG | Single | 300,000 | — |
| 30 | Olefinic ionomer | Single | — | — |
| 31 | Acrylic resin | Single | — | — |
| 32 | PW | Single | — | — |
| 33 | PEG/PW | 92.5/7.5 | 40,000 | 373 |

In the table, PEG represents polyethylene glycol, PW paraffin wax, PEWAX polyethylene wax, AWAX amide wax, and PTFE polytetrafluoroethylene. Further, PEGs having the number average molecular weights of 40,000, 20,000, 500,000, and 15,000 are Polyethylene Glycol 40000, 20000, 500000, and 15000 respectively made by Wako Pure Chemical Industries, Ltd., and KANTO Chemical and PEG having the number average molecular weight of 300,000 is PEO-1 made by Sumitomo Seika Chemicals Co., Ltd. PW having the average molecular weight of 373 is 130 made by Nippon Seiro Co., Ltd., PW having the average molecular weight of 361 is 125 made by Nippon Seiro Co., Ltd., PW having the average molecular weight of 389 is 135 made by Nippon Seiro Co., Ltd., PW having the average molecular weight of 423 is HNP-5 made by Nippon Seiro Co., Ltd., PEWAX is Polyron L-618 made by Chukyo Yushi Co., Ltd., AWAX is CEPAFLOUR995 made by BYK-Chemie Japan KK, PTFE is KTL-2N made by Kitamura Ltd., and the water-soluble epoxy compound is DENACOL EX-830 made by Nagase ChemteX Corporation.

Example 2

Surfaces on one side or both the sides of electrogalvanized steel sheets (1 mm in thickness, coating weight: 30 $g/m^2$) were coated with the resin composition Nos. 3, 14, and 15 in Table 1 so that the coating weight might be 1 $g/m^2$ by the same method as Example 1. The formability (formability and friction coefficients), the film removability, and the blocking resistance of the produced resin-coated metal sheets were

TABLE 2

| Metal Sheet No | Composition No. | Coating weight | LDH forming height | Friction coefficient | Film removability | Blocking resistance |
|---|---|---|---|---|---|---|
| 1 | 1 | 1.0 | 37.1 | 0.04–0.05 | ○ | ○ |
| 2 | 2 | 1.0 | 37.8 | 0.04–0.05 | ○ | ○ |
| 3 | 3 | 1.0 | 38.5 | 0.04–0.05 | ○ | ○ |
| 4 | 4 | 1.0 | 41.5 | 0.04–0.05 | ○ | ○ |
| 5 | 5 | 1.0 | 41.2 | 0.04–0.05 | ○ | ○ |
| 6 | 6 | 1.0 | 38.0 | 0.05–0.06 | ○ | ○ |
| 7 | 7 | 1.0 | 37.4 | 0.06–0.07 | ○ | ○ |
| 8 | 8 | 1.0 | 41.7 | 0.04–0.05 | ○ | ○ |
| 9 | 9 | 1.0 | 41.0 | 0.06–0.07 | ○ | ○ |
| 10 | 10 | 1.0 | 41.1 | 0.06–0.07 | ○ | ○ |
| 11 | 11 | 1.0 | 40.7 | 0.04–0.05 | ○ | ○ |
| 12 | 12 | 1.0 | 43.0 | 0.04–0.05 | ○ | ○ |
| 13 | 13 | 1.0 | 43.7 | 0.04–0.05 | ○ | ○ |
| 14 | 14 | 1.0 | 45.1 | 0.04–0.05 | ○ | ○ |
| 15 | 15 | 1.0 | 42.7 | 0.04–0.05 | ○ | ○ |
| 16 | 16 | 1.0 | 42.6 | 0.05–0.06 | ○ | ○ |
| 17 | 17 | 1.0 | 41.8 | 0.06–0.07 | ○ | ○ |
| 18 | 18 | 1.0 | 38.7 | 0.04–0.05 | ○ | ○ |
| 19 | 19 | 1.0 | 40.8 | 0.06–0.07 | ○ | ○ |
| 20 | 20 | 1.0 | 43.7 | 0.05–0.06 | ○ | ○ |
| 21 | 4 | 0.1 | 40.0 | 0.06–0.07 | ○ | ○ |
| 22 | 4 | 0.3 | 40.8 | 0.05–0.06 | ○ | ○ |
| 23 | 4 | 0.5 | 41.2 | 0.04–0.05 | ○ | ○ |
| 24 | 4 | 1.5 | 41.5 | 0.04–0.05 | ○ | ○ |
| 25 | 4 | 2.0 | 41.7 | 0.04–0.05 | ○ | Δ |
| 26 | 4 | 2.5 | 41.7 | 0.03–0.04 | ○ | Δ |
| 27 | 21 | 1.0 | 35.8 | 0.09–0.10 | ○ | X |
| 28 | 22 | 1.0 | 36.0 | 0.05–0.06 | Δ | Δ |
| 29 | 23 | 1.0 | 35.1 | 0.06–0.07 | Δ | Δ |
| 30 | <u>24</u> | 1.0 | 34.4 | 0.05–0.06 | ○ | ○ |
| 31 | <u>25</u> | 1.0 | 33.5 | 0.03–0.04 | ○ | ○ |
| 32 | <u>26</u> | 1.0 | 35.8 | 0.10 | ○ | Δ |
| 33 | <u>27</u> | 1.0 | 32.4 | 0.10 | X | X |
| 34 | <u>28</u> | 1.0 | 33.1 | 0.10 | ○ | ○ |
| 35 | <u>29</u> | 1.0 | 32.0 | 0.12 | ○ | ○ |
| 36 | <u>30</u> | 1.0 | 27.6 | 0.23 | X | ○ |
| 37 | <u>31</u> | 1.0 | 25.4 | 0.21 | ○ | ○ |
| 38 | <u>32</u> | 1.0 | 34.1 | 0.03–0.04 | X | X |
| 39 | 4 | 0.08 | 34.1 | 0.09–0.10 | ○ | ○ |
| 40 | 4 | 2.7 | 42.4 | 0.05–0.06 | ○ | Δ |
| 60 | 33 | 1.0 | 38.2 | 0.04–0.05 | ○ | ○ |

In Tables 1 and 2, the underlined items and numerals mean that those are outside the ranges stipulated in the present invention.

As shown in the results, in the cases where the resin layers contain only resin such as PEG (Metal sheet Nos. 33 to 37), the formability is poor and, in the case where only paraffin wax is contained (Metal sheet No. 38), the film removability and the blocking resistance are poor. Even in the cases where both PEG and paraffin wax are contained, the formability is poor when the molecular weights thereof are outside the ranges stipulated in the present invention (Metal sheet Nos. 30 to 32). On the other hand, in the cases where the resin layers contain both PEG and paraffin wax and the molecular weights thereof are within the ranges stipulated in the present invention (Metal sheet Nos. 1 to 29), it has been verified that all of the formability, the film removability, and the blocking resistance are satisfactory.

measured in the same way as Example 1. The results are shown in Table 3.

TABLE 3

| Metal Sheet No. | Composition No. | Coating weight | LDH forming height | Friction coefficient | Film removability | Blocking resistance |
|---|---|---|---|---|---|---|
| 41 | 3 | 1.0 | 46.5 | 0.06–0.07 | ○ | ○ |
| 42 | 14 | 1.0 | 48.1 | 0.05–0.06 | ○ | ○ |
| 43 | 15 | 1.0 | 47.0 | 0.04–0.05 | ○ | ○ |

As shown in the results, even in the cases of the resin-coated metal sheets wherein galvanized steel sheets are used instead of aluminum alloy sheets, good formability, film removability, and blocking resistance are obtained.

Example 3

Surfaces on both the sides of 6K21 aluminum sheets (30 mm×100 mm, 1 mm in thickness) were coated with the resin compositions Nos. 1 to 32 in Table 1 so that the coating weight might be 0.8 g/m² per one side by the same method as Example 1. Two sheets of the produced resin-coated metal sheets were overlapped with each other so that the overlapped width might be 30 mm. The overlapped part was subjected to spot welding one spot by one spot with consecutive 30 spots in total under the pressing force of 2.9 kN and the electrifying conditions of 29 kA×4 cycles, and the weld strengths of the first, fifth, ninth, sixteenth, twenty-fourth, and thirtieth spot welding were measured. An average weld strength of 2.7 kN or more was evaluated as "good" shown by "O", an average weld strength of 2.0 kN or more to less than 2.7 kN was evaluated as "fair" shown by "Δ", and an average weld strength of less than 2.0 kN or a case where weld was not successfully done was evaluated as "poor" shown by "X". The measurement results are shown in Table 4.

TABLE 4

| Metal Sheet No. | Composition No. | Weldability |
|---|---|---|
| 44 | 1 | Δ |
| 45 | 2 | Δ |
| 46 | 3 | Δ |
| 47 | 4 | Δ |
| 48 | 5 | Δ |
| 49 | 6 | Δ |
| 50 | 7 | Δ |
| 51 | 8 | Δ |
| 52 | 9 | Δ |
| 53 | 10 | O |
| 54 | 11 | Δ |
| 55 | 12 | Δ |
| 56 | 13 | Δ |
| 57 | 14 | Δ |
| 58 | 15 | Δ |
| 59 | 16 | Δ |
| 60 | 17 | Δ |
| 61 | 18 | O |
| 62 | 19 | O |
| 63 | 20 | O |
| 64 | 21 | Δ |
| 65 | 22 | Δ |
| 66 | 23 | Δ |
| 67 | <u>24</u> | Δ |
| 68 | <u>25</u> | Δ |
| 69 | <u>26</u> | Δ |
| 70 | <u>27</u> | O |
| 71 | <u>28</u> | Δ |
| 72 | <u>29</u> | Δ |
| 73 | <u>30</u> | X |
| 74 | <u>31</u> | X |
| 75 | <u>32</u> | Δ |

Further, a 6K21 aluminum sheet which was not coated with a resin composition was subjected to similar treatment and the weld strength thereof was measured and was 2.8 kN. AS a consequence, it was verified that, in the case of a resin-coated metal sheet according to the present invention, considerable deterioration of weldability was not observed even when a resin layer was formed.

What is claimed is:

1. A resin-coated metal sheet suitable for press forming, wherein a resin layer is laminated on one side or both sides of the metal sheet;
wherein the resin layer consists of
a polyethylene glycol whose number average molecular weight ranges from 18,000 to 500,000,
a paraffin wax dissolved in the resin layer and whose average molecular weight is 400 or less in an amount ranging from 35 to 50% by mass, based on the total mass of the resin layer,
optionally, a water soluble epoxy compound, and
optionally, at least one of a polyethylene wax, an amide wax, polytetrafluoroethylene, and combinations thereof.

2. The resin-coated metal sheet according to claim 1, wherein the resin layer consists of
the polyethylene glycol,
the paraffin wax,
at least one of the polyethylene wax, the amide wax, the polytetrafluoroethylene, and combinations thereof, and
optionally, the water soluble epoxy compound.

3. The resin-coated metal sheet according to claim 1, wherein the resin layer consists of
the polyethylene glycol,
the paraffin wax,
the water-soluble epoxy compound, and
optionally, at least one of the polyethylene wax, the amide wax, the polytetrafluoroethylene, and combinations thereof.

4. The resin-coated metal sheet according to claim 2, wherein the resin layer consists of
the polyethylene glycol,
the paraffin wax,
at least one of the polyethylene wax, the amide wax, the polytetrafluoroethylene, and combinations thereof, and
the water-soluble epoxy compound.

5. The resin-coated metal sheet according to claim 1, wherein a weight ratio of the polyethylene glycol to the paraffin wax in the resin layer ranges from 99 to 1 and 60 to 40.

6. The resin-coated metal sheet according to claim 4, wherein a weight ratio of the polyethylene glycol and the water-soluble epoxy compound to the paraffin wax and the at least one of the polyethylene wax, the amide wax, the polytetrafluoroethylene, and combinations thereof in the resin layer ranges from 99 to 1 and 60 to 40.

7. The resin-coated metal sheet according to claim 1, wherein the coating weight of the resin layer per one side of the metal sheet ranges from 0.1 g/m² to 2.5 g/m².

8. A resin composition suitable for press forming consisting of
a polyethylene glycol whose number average molecular weight ranges from 18,000 to 500,000,
a paraffin wax dissolved in the resin layer and whose average molecular weight is 400 or less, in an amount ranging from 35 to 50% by mass, based on the total mass of the resin composition,
a solvent,
optionally, a water-soluble epoxy compound, and
optionally, at least one of a polyethylene wax, an amide wax, polytetrafluoroethylene, and combinations thereof.

9. The resin composition according to claim 8, wherein the resin composition consists of
the polyethylene glycol,
the paraffin wax,
the solvent,
the at least one of the polyethylene wax, the amide wax, the polytetrafluoroethylene, and combinations thereof, and
optionally, the water-soluble epoxy compound.

10. The resin composition according to claim 8, wherein the resin composition consists of
the polyethylene glycol,
the paraffin wax,
the solvent,
the water-soluble epoxy compound, and optionally, the at least one of the polyethylene wax, the amide wax, the polytetrafluoroethylene, and combinations thereof.

11. The resin composition according to claim 9, wherein the resin composition consists of the polyethylene glycol,
the paraffin wax,
the solvent,
the water-soluble epoxy compound, and
the at least one of the polyethylene wax, the amide wax, the polytetrafluoroethylene, and combinations thereof.

12. The resin-coated metal sheet of claim 1,
wherein the resin layer consists of the polyethylene glycol and the paraffin wax, and wherein the resin layer does not consist of the water soluble epoxy compound and the at least one of the polyethylene wax, the amide wax, polytetrafluoroethylene, and combinations thereof.

13. The resin-coated metal sheet of claim 2, wherein the resin layer consists of the polyethylene glycol,
the paraffin wax, and
the at least one of the polyethylene wax, the amide wax, the polytetrafluoroethylene, and combinations thereof, and
wherein the resin layer does not consist of the water soluble epoxy compound.

14. The resin-coated metal sheet according to claim 1, wherein the resin layer consists of
the polyethylene glycol,
the paraffin wax, and
the water-soluble epoxy compound, and
wherein the resin layer does not consist of the at least one of the polyethylene wax, the amide wax, the polytetrafluoroethylene, and combinations thereof.

15. The resin composition of claim 8, wherein the resin composition consists of the polyethylene glycol,
the paraffin wax, and
the solvent, and wherein the resin composition does not consist of
the water-soluble epoxy compound and the at least one of the polyethylene wax, the amide wax, the polytetrafluoroethylene, and combinations thereof.

16. The resin composition of claim 9, wherein the resin composition consists of the polyethylene glycol,
the paraffin wax,
the solvent,
the at least one of the polyethylene wax, the amide wax, the polytetrafluoroethylene, and combinations thereof, and wherein the resin composition does not consist of the water-soluble epoxy compound.

17. The resin-coated metal sheet of claim 3, wherein the resin coated metal sheet consists of
the polyethylene glycol,
the paraffin wax,
the polytetrafluoroethylene, and
optionally, the water soluble epoxy compound.

18. The resin-coated metal sheet of claim 1, wherein the resin layer is laminated on both sides of the metal sheet.

19. The resin-coated metal sheet of claim 1, wherein the resin layer is laminated on one side of the metal sheet.

20. The resin-coated metal sheet of claim 3, wherein the resin coated metal sheet consists of
the polyethylene glycol,
the paraffin wax,
the polyethylene wax, and
optionally, the water soluble epoxy compound.

* * * * *